United States Patent
Obayashi

(10) Patent No.: US 7,815,247 B2
(45) Date of Patent: Oct. 19, 2010

(54) REINFORCING MEMBER FOR VEHICLE CENTER PILLAR

(75) Inventor: Akira Obayashi, Toyota (JP)

(73) Assignee: Toyoda Iron Works Co., Ltd (JP)

( * ) Notice: Subject to any disclaimer, the term of this patent is extended or adjusted under 35 U.S.C. 154(b) by 0 days.

(21) Appl. No.: 12/213,526

(22) Filed: Jun. 20, 2008

(65) Prior Publication Data

US 2008/0315628 A1    Dec. 25, 2008

(30) Foreign Application Priority Data

Jun. 20, 2007    (JP) .............................. 2007-163105

(51) Int. Cl.
B62D 25/04    (2006.01)
(52) U.S. Cl. ................................. 296/193.06
(58) Field of Classification Search ............ 296/193.06, 296/203.03, 187.12
See application file for complete search history.

(56) References Cited

U.S. PATENT DOCUMENTS

| | | | | |
|---|---|---|---|---|
| 6,217,109 | B1* | 4/2001 | Okana et al. ........... | 296/203.03 |
| 6,322,135 | B1* | 11/2001 | Okana et al. ........... | 296/203.03 |
| 6,474,726 | B1* | 11/2002 | Hanakawa et al. .......... | 296/191 |
| 7,070,228 | B2* | 7/2006 | Shimizu et al. ......... | 296/187.01 |
| 7,407,222 | B2* | 8/2008 | Anderson et al. ...... | 296/193.06 |
| 2005/0150580 | A1* | 7/2005 | Akamizu et al. ............ | 148/654 |
| 2006/0137768 | A1* | 6/2006 | Yuse et al. .................. | 148/320 |
| 2007/0080563 | A1* | 4/2007 | Eipper et al. ........... | 296/193.06 |
| 2007/0144633 | A1* | 6/2007 | Kizu et al. .................. | 148/603 |
| 2007/0196685 | A1* | 8/2007 | Futamura et al. ............ | 428/659 |
| 2008/0118390 | A1* | 5/2008 | Kizu et al. ..................... | 420/85 |
| 2008/0295928 | A1* | 12/2008 | Kim et al. ................... | 148/651 |
| 2008/0315628 | A1* | 12/2008 | Obayashi ............... | 296/193.06 |

FOREIGN PATENT DOCUMENTS

JP    2006-218964    10/2006
KR    10-2004-0001152    1/2004

* cited by examiner

Primary Examiner—H Gutman
(74) Attorney, Agent, or Firm—Finnegan, Henderson, Farabow, Garrett and Dunner, LLP

(57) ABSTRACT

Deformation by camber recovery etc. due to non-uniform residual stress is suppressed, and occurrence of crack and burr is suppressed by improving press forming property of a roof side T-shaped portion, so that a reinforcing member having a predetermined shape accuracy is manufactured easily and inexpensively by pressing. A reinforcing member (12) is constructed by three members, i.e. an upper member (20), a lower member (22) and a central member (24). A tensile strength of the upper member (20) is selected lower than that of the central member (24), and is higher than that of the lower member (22). In comparison to a case where the upper member (20) and the central member (24) are constructed integrally by an ultra-high tensile steel plate, fluctuation of internally generated residual stress is made small. Shape accuracy is thereby improved by the reduced deforming amount due to camber recovery etc., thus press forming being facilitated. Also, a roof side T-shaped portion constructed by the upper member (20) is improved in the drawing property, and the door frame corner portions (30) and (32) are improved in the outer trimming property. Thus, the shape accuracy is improved, and yield and productivity is increased by suppression of crack generation.

8 Claims, 3 Drawing Sheets

REINFORCING MEMBER FOR VEHICLE CENTER PILLAR

The present application is based on Japanese Patent Application No. 2007-163105, and content thereof is incorporated herein.

BACKGROUND OF THE INVENTION

1. Field of the Invention

The present invention relates to a reinforcing member for vehicle center pillar, and especially it relates to an improvement of a reinforcing member constructed using a plurality of steel plates that are different in tensile strength.

2. Description of the Prior Art

To secure safety in a lateral collision of an automobile, a center pillar is reinforced. That is, a reinforcing member (reinforcement) is fitted and fixed integrally by welding to an interior of a center pillar constructed by a center pillar outer panel and a center pillar inner panel to have a closed cross-section. Due to characteristics of cross-sectional shape, such a center pillar reinforcing member is low in the section modulus (corresponding to a cross section second moment) at an upper part, and is high in the section modulus at a lower part. In view of this, the upper part is constructed by a thick plate and the lower part is constructed by a thin plate. However recently, to satisfy needs for improvement of lateral collision performance and for realizing light weight i.e. weight saving to improve fuel consumption, it is proposed to form the upper part by an ultra-high tensile steel plate.

An example of such a reinforcing member is described in Patent Document 1 (Japanese Unexamined Patent Publication No. 2006-281964) and is shown in FIG. 3. FIG. 3 shows a reinforcing member for center pillar at a left side face of a vehicle, with FIG. 3A being a front view as viewed from a left side of the vehicle, and FIG. 3B being a right side view of FIG. 3A, i.e. a side view as viewed from a rear side of the vehicle. The reinforcing member is constructed by two members, i.e. an upper member 100 and a lower member 102 that are bonded by welding integrally.

The upper member 100 is constructed by an ultra-high tensile steel plate with tensile strength of 980 MPa class, and the lower member 102 is constructed by a high tensile steel plate with a tensile strength of 440 MPa class. With suppressing bending into L-shape and buckling of the upper part of the center pillar upon lateral collision, a predetermined safety performance is secured, and with employing the thin and lightweight upper member 100 constructed by the ultra-high tensile steel plate fuel consumption is improved.

A center pillar reinforcing member described in Patent Document 2 (KR Publication No. 20040001152) is divided into three members, i.e. an upper portion a central portion, and a lower portion. By selecting the plate thickness of central reinforcing member thicker than those of the upper and lower reinforcing member members, deformation of the central portion is suppressed to thereby improve safety performance.

However, with the center pillar reinforcing member constructed by the two members i.e. the upper member and the lower member that are different in tensile strength as in Patent Document 1, non-uniform residual stress is generated readily in a product interior at the upper part constructed by the ultra-high tensile steel plate. Thus, deforming amounts due to camber recovery that accompanies elastic recovery and twisting become large, which lowers shape accuracy (see FIG. 3). This makes pressing for securing the predetermined shape accuracy in the reinforcing member difficult.

Also, at a roof side T-shaped portion of the reinforcing member i.e. at an upper T-shaped portion connected to a roof side rail, defects such as cracking occur readily in a product cross-section, due to poor pressing forming property such as drawing property. Moreover, because of inclination of the upper part of the reinforcing member toward an inner side of the vehicle, an angle thereof changes compared with a general pressing direction, so that the door frame corner portions being difficult in the outer trimming tend to generate burr readily. Lowered yield and productivity due to generation of such cracks and burrs, the employment of expensive ultra-high tensile steel, and the abovementioned difficulty of pressing, cause a large increase of manufacturing cost.

Meanwhile, when with the reinforcing member being divided into three portions, the plate thickness of the central reinforcing member is made thick as in Patent Document 2, weight increases as increase of the plate thickness. Moreover, strength and rigidity of the upper reinforcing member resulted from the small section modulus and thin plate thickness are relatively lowered, which worsens balance of strength and rigidity of the reinforcing member as a whole. For this reason, an adequate safety performance increasing effect of the reinforcing member cannot be obtained necessarily.

SUMMARY OF THE INVENTION

The present invention has been made with the above circumstances as a background, and has objects to manufacture a reinforcing member having a predetermined shape accuracy easily and inexpensively by pressing i.e. press-working, by (i) securing a predetermined safety performance while suppressing increase of weight and lowering of balance of strength and rigidity of a reinforcing member as a whole; (ii) suppressing deformation by camber recovery and twisting due to non-uniform residual stress regardless of employment of a high tensile steel plate; and (iii) improving press forming properties of a roof side T-shaped portion to suppress generation of cracks and burrs.

For achieving the above object, in a first aspect of the present invention, (a) a reinforcing member for vehicle center pillar, prepared by integrally bonding by welding a plurality of steel plates different in tensile strength and thereafter being formed to a predetermined shape by pressing, to be integrally fixed to a vehicle center pillar to reinforce the vehicle center pillar, (b) the reinforcing member comprising a substantially T-shaped upper member to be connected to a roof side rail of the vehicle center pillar, a lower member to be connected to a side sill of the vehicle center pillar, and a central member disposed between the upper member and the lower member; (c) wherein the upper member, the lower member and the central member respectively constructed by separate steel plates mutually different in tensile strength, with the tensile strength of the steel plate of the upper member being lower than the tensile strength of the steel plate of the central member and being higher than the tensile strength of the steel plate of the lower member.

In a second aspect of the present invention, in the first aspect, the upper member is disposed within a predetermined range of no more than 1.5 times a dimension from an upper end thereof to a lower end of a door frame corner portion continuing from the roof side rail to the center pillar to completely contain the door corner portion therein.

In a third aspect of the present invention, in the first or second aspect, (a) the upper member is constructed by a high tensile steel plate with a tensile strength in a range of no less than 590 MPa and less than 780 MPa, (b) the central member is constructed by a high tensile steel plate with a tensile strength of no less than 780 MPa, and (c) the lower member is constructed by a high tensile steel plate with a tensile strength of less than 590 MPa.

In a fourth aspect of the present invention, in any one of the first to third aspects, the reinforcing member is formed by hot pressing, and the central member is constructed by a steel plate for hot pressing having a quenching property to have the tensile strength of no less than 780 Mpa after hot pressing.

In a fifth aspect of the present invention, a reinforcing member for vehicle center pillar, being integrally fixed to a vehicle center pillar to reinforce the vehicle center pillar, comprising (a) a substantially T-shaped upper member to be connected to a roof side rail, a lower member to be connected to a side sill, and a central member disposed between the upper member and the lower member and bonded integrally by welding with the upper member and the lower member, (b) wherein the upper member, the lower member and the central member are respectively constructed by separate steel plates mutually different in tensile strength, with the tensile strength of the steel plate of the upper member being lower than the tensile strength of the steel plate of the central member and being higher than the tensile strength of the steel plate of the lower member.

The reinforcing member for vehicle center pillar according to the first aspect of the present invention is constructed by the three members including the upper member, the lower member and the central member, with the tensile strength of the steel plate of the upper member being selected lower than that of the steel plate of the central member and being higher than that of the steel plate of the lower member. Thus, fluctuation of internally generated residual stress is made small, in comparison to the conventional reinforcing member in which the upper member and the central member are constructed integrally by an ultra-high tensile steel plate. Consequently, deforming amount due to chamber recovery that accompany elastic recovery and twisting is reduced to thereby increase the shape accuracy of the reinforcing member, and the forming by pressing is facilitated.

Also, a roof side T-shaped portion constructed by the upper member is improved in the drawing property, and the door frame corner portion is improved in the outer trimming property. In these points, the shape accuracy of the reinforcing member is improved, and generation of cracks within the product cross-section is suppressed to increase the yield and productivity.

The press forming properties such as the forming accuracy, the drawing property and the outer trimming property are improved. The central member constructed by an ultra-high tensile having a high-strength, can be pressed with excellent shape accuracy even upon cold pressing. Consequently, a lightweight i.e. weight saved reinforcing member with a predetermined high strength can be manufactured inexpensively.

Also, the upper member, though being lower in tensile strength than the central member, is higher in tensile strength than the lower member. Therefore, with suppressing the lowering of strength and rigidity balance, and the weight increase of the reinforcing member as a whole, the predetermined safety performance can be secured by suppressing the center pillar from entering into a vehicle compartment as much as possible, upon lateral collision.

That is, the lower member which is generally large in the section modulus, is not required to have a very high tensile strength. Meanwhile, the central member is a portion that, though having the highest influence on safety performance for an occupant, is smaller in the section modulus than the lower member. Therefore, the central member is required to have a high tensile strength to secure the predetermined safety performance with realizing weight saving. Also, in the upper member having a main role to be bonded with the roof rail, size of the bonding area with the roof rail influences the bonding strength more than the tensile strength thereof. Thus, by using a steel plate for the upper member with the tensile strength lower than that of the central member, the press forming property of the upper member is improved to increase the shape accuracy, and an adequate bonding strength can be secured.

With the second aspect of the present invention, the upper member is disposed within the predetermined range of no more than 1.5 times the dimension from its upper end to the lower end of the door frame corner portion, to completely contain the door frame corner portion that continues from the roof side rail to the center pillar side. Improving the press forming property of the roof side T-shaped portion increases the shape accuracy of the reinforcing member. The central member of high tensile strength can not only secure the predetermined strength required for the reinforcing member but realizes the weight saving.

With the third aspect of the present invention, the upper member is constructed by the high tensile steel plate with the tensile strength in the range of no less than 590 MPa and less than 780 MPa, the central member is constructed by the high tensile steel plate with the tensile strength of no less than 780 MPa, and the lower member is constructed by the high tensile steel plate with the tensile strength of less than 590 MPa. Therefore, the shape accuracy of the reinforcing member is increased by improving the press forming property, the predetermined strength required for the reinforcing member can be secured, and weight saving is realized.

With the fourth aspect of the present invention, the reinforcing member is formed by hot pressing. Because of the material softened by heating, the press forming property is improved further. Moreover, by shape freezing property due to quenching in a press mold, deformation by camber recovery and twisting after pressing is suppressed, so that shape accuracy of the reinforcing member is improved further. Also, by using a steel plate for hot pressing as the central member, the tensile strength after hot pressing is set no less than 780 MPa, and can be set no less than 1400 MPa depending on the steel kind. Thus, the steel plate can be set thin in plate thickness to realize further weight saving.

The reinforcing member according to the fifth aspect of the present invention is constructed by the three members including the upper member, the lower member and the central member as is the reinforcing member according to the first aspect of the present invention. In addition, the tensile strength of the steel plate of the upper member is selected lower than that of the steel plate of the central member and higher than that of the steel plate of the lower member. Thus, the same operation and effects as those of the first aspect of the present invention can be provided.

BEST MODE FOR CARRYING OUT THE INVENTION

The reinforcing member according to the present invention is integrally fixed by fixing means such as welding and bolt fastening to an inside of a center pillar constructed by a center pillar outer panel and a center pillar inner panel to have a closed cross section. However, the shape and structure of the center pillar itself can be determined as suited, and the center pillar does not necessarily have the closed cross section, for example.

The plurality of steel plates constructing the reinforcing member, specifically, the three steel plates different in tensile strength, are integrally bonded by welding such as an arc welding, seam welding, plasma welding, laser welding, or spot welding, for example. The welding is performed with lateral ends being butted against each other within the same plane, or with the lateral ends being overlapped by just predetermined dimensions. Plurality of steel plates are formed to a predetermined shape thereafter by cold pressing or hot pressing.

The reinforcing member according to the fifth aspect of the present invention can be manufactured favorably by pressing after bonding by welding the three types of steel plates, in the same manner as in the first aspect of the present invention. However, pressing after bonding by welding is not necessarily required, and the manufacturing method can be determined as suited.

The upper member is constructed to have the T-shaped portion to be connected to the roof side rail. The lower member is also constructed to have, for example, a T-shaped portion (an inverted T-shape) to be connected to the side sill. The central member has, for example, a U shape cross section to be fitted in the center pillar outer panel having a U shape. It has flanges that are bent at substantially right angle outward at respective edges at an open side of the U shape. The central member is integrally fixed by welding, etc., to the center pillar outer panel and the center pillar inner panel with the flanges being sandwiched between the both panels. Vertical column portions of the upper member and the lower member that are continuous with the central member are formed to have the same U shape cross section as the central member.

With the second aspect of the present invention, the upper member is disposed within a predetermined range of no more than 1.5 times the dimension from its upper end to the lower end of the door frame corner portion to completely contain the door frame corner portion. However, the upper member is preferably selected as short as possible within the range of completely containing the door frame corner portion, to secure a higher strength (safety), and the upper member may extend just to the lower end of the door frame corner portion.

The door frame corner portions having a smooth, arcuate shape, are normally disposed at two locations at respective sides in a front and rear of the vehicle. The lower end of each door frame corner portion is a terminating end of the arcuate shape. In an embodiment according to the first aspect of the present invention, the upper member may be disposed over a range exceeding 1.5 times the dimension from its upper end to the lower end of the door frame corner portion.

A height range of the lower member is set as suited in consideration of the cross-sectional shape, size, etc., thereof to provide a predetermined reinforcing strength. However, the height range is preferably set within a range of approximately 1/5 to 1/3 of a total height H of the reinforcing member.

The upper member is preferably constructed by a high tensile steel plate with the tensile strength in a range of no less than 590 MPa and less than 780 MPa, the central member is preferably constructed by a high tensile steel plate with the tensile strength of no less than 780 MPa and no more than 1180 MPa, and the lower member is preferably constructed by a high tensile steel plate with the tensile strength of less than 590 MPa. The central member is preferably formed of an ultra-high tensile steel plate with the tensile strength of no less than 980 MPa.

Upon forming by hot pressing, the central member is preferably constructed by a high tensile steel plate with the tensile strength after the hot pressing of no less than 780 MPa. It is more preferably constructed by an ultra-high tensile steel plate with the tensile strength after hot pressing of no less than 1180 MPa. A steel plate for hot pressing having a quenching property may be used for the central member, while normal steel plates may be used for both the upper member and the lower member. However, within a range satisfying the magnitude relationships of the tensile strengths with other member, steel plates for hot pressing may used for both the upper member and the lower member as well.

In the hot pressing using the steel plate for hot pressing, a blank material in a state of being heated to an austenite region is pressed using a low-temperature press mold to be formed to a predetermined shape and to be quenched at the same time, for thereby causing martensite transformation to be hardened. In the hot pressing, by cooling the blank material with maintaining the forming state (constrained state) in the press mold for a predetermined time, the formed shape is maintained regardless of the transformation and contraction due to cooling of the blank material. In this way, a high shape accuracy is achieved.

PREFERRED EMBODIMENT OF THE INVENTION

An embodiment of the present invention shall now be described in detail with reference to the drawings.

Figure 1A:
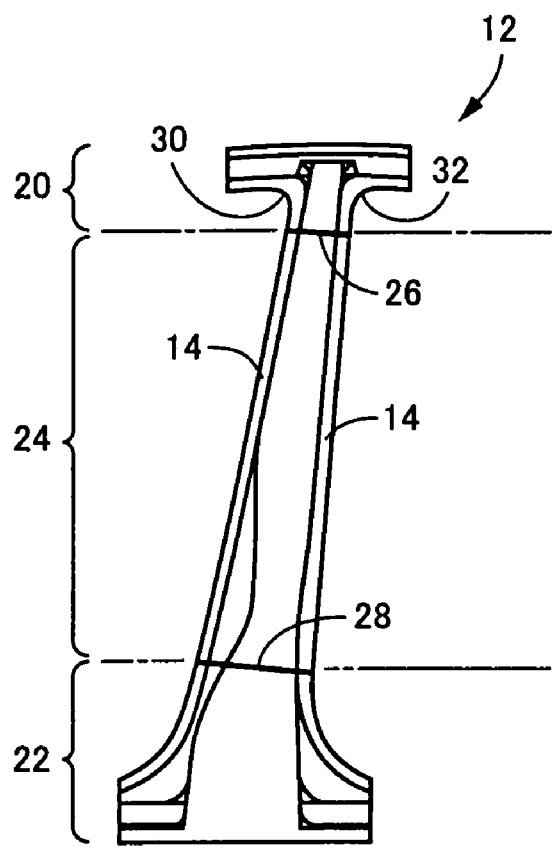
FIG. 1 shows a reinforcing member for vehicle center pillar that is an embodiment of the present invention, with FIG. 1A being a front view as viewed from a left lateral side of a vehicle, and FIG. 1B being a right side view of FIG. 1A.
Figure 1B:
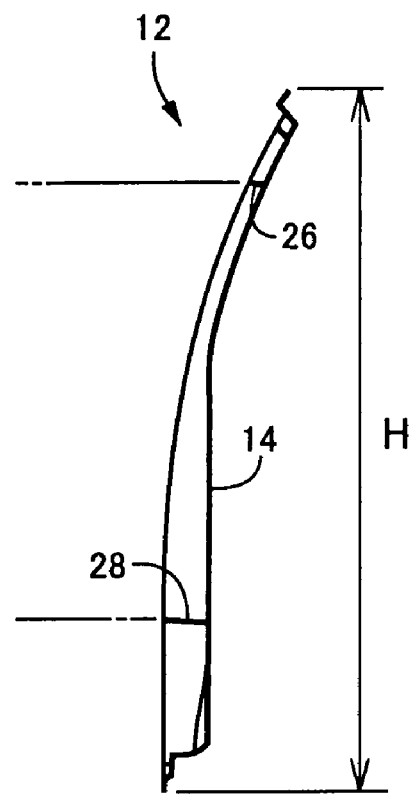
Figure 3B:
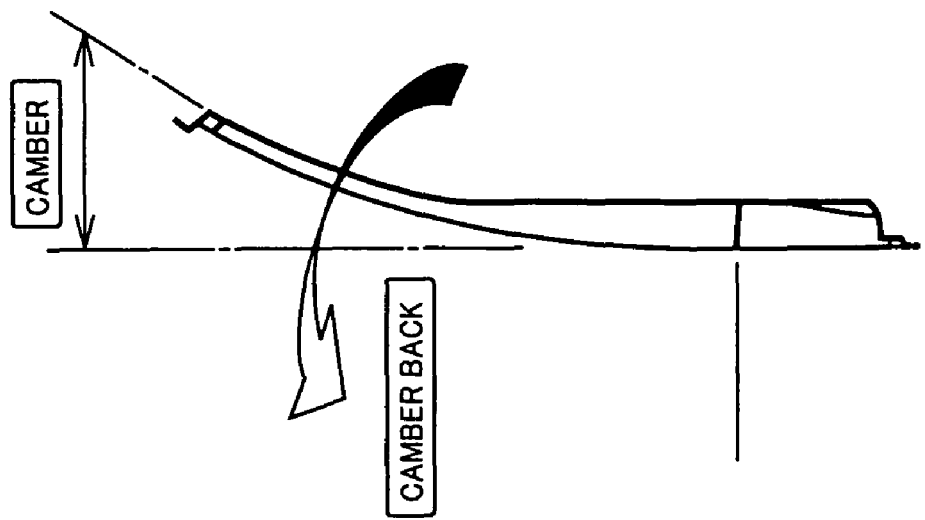
FIG. 3 shows an example of a conventional reinforcing member for vehicle center pillar and corresponds to FIG. 1, with FIG. 3A being a front view as viewed from a left lateral side of a vehicle, and FIG. 3B being a right side view of FIG. 3A.
Figure 3A:
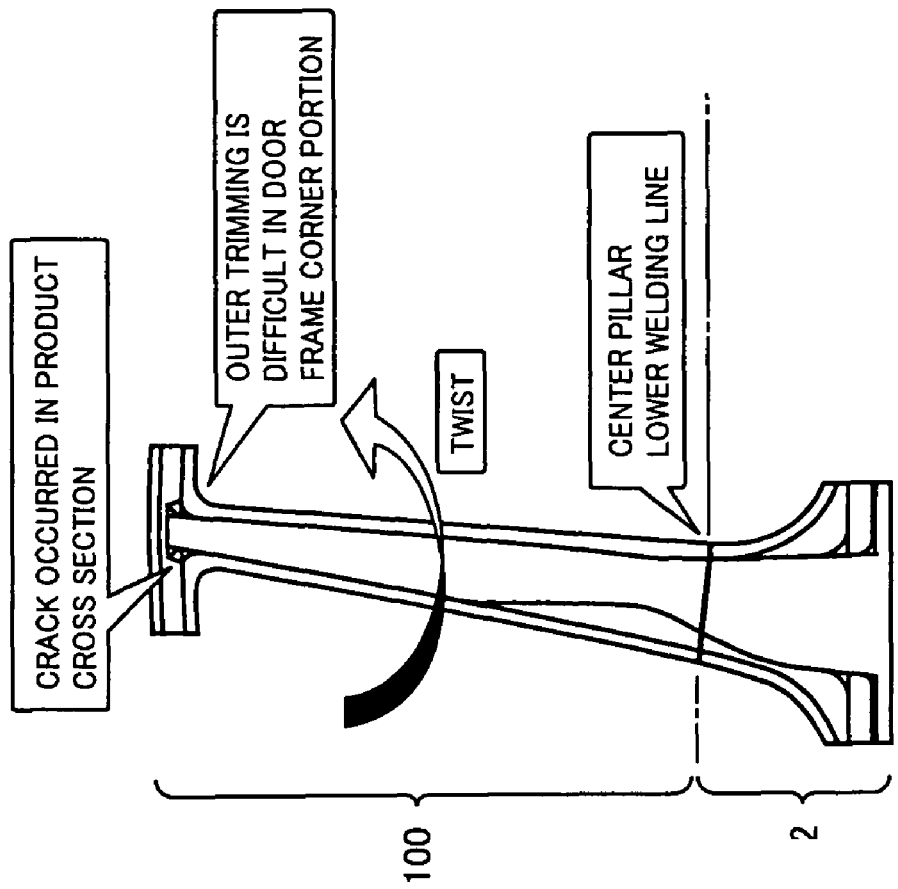

FIG. 1 shows a reinforcing member 12 for vehicle center pillar that is one embodiment of the present invention and corresponds to FIG. 3 described above, with FIG. 1A being a front view as viewed from a left lateral side of a vehicle, and FIG. 1B being a right side view of FIG. 1A, that is, a side view as viewed from a rear side of the vehicle.

Figure 2A:
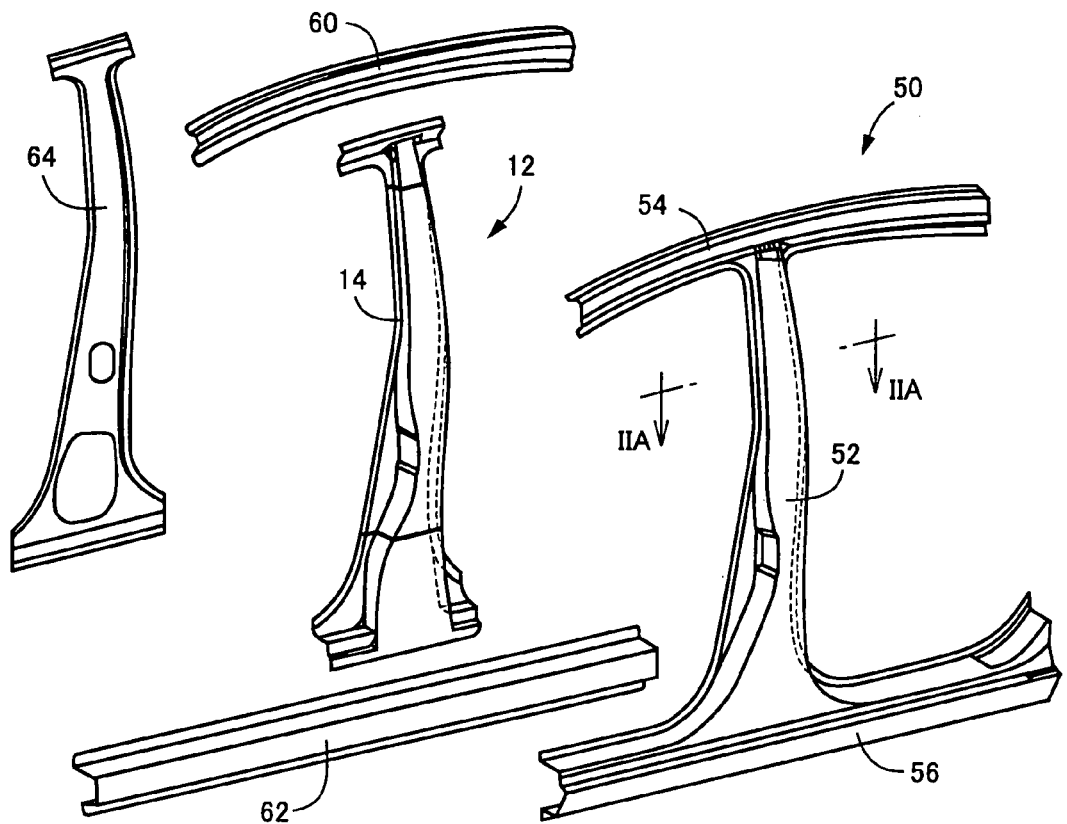
FIG. 2 shows diagrams for describing the vehicle center pillar in which the reinforcing member of FIG. 1 is disposed, with FIG. 2A being an exploded perspective view of the center pillar including a roof side rail and a side sill, and FIG. 2B being an enlarged sectional view of the center pillar at a sectional position IIA-IIA.

FIG. 2 shows diagrams for describing the vehicle center pillar 10 in which the reinforcing member 12 is disposed, with FIG. 2A being an exploded perspective view of the center pillar 10 including a roof side rail and a side sill, and FIG. 2 being an enlarged sectional view of the center pillar 10 at a sectional position IIA-IIA.

In FIG. 2, at a portion 50 where a side panel of a left side face of the vehicle is cut away, a roof side rail outer portion 54 and a side sill outer portion 56 are disposed integrally at upper and lower ends of a center pillar outer portion 52, respectively.

The reinforcing member 12 has its respective upper and lower ends integrally fixed by welding to vehicle outer face side of a roof side rail reinforcing member 60 and a side sill reinforcing member 62, and is integrally fixed by welding to a vehicle inner face side of the side panel 50. That is, the upper end of the reinforcing member 12 is integrally fixed to the side panel 50 with being sandwiched between the roof side rail reinforcing member 60 and the roof side rail outer portion 54. The lower end of the reinforcing member 12 is integrally fixed to the side panel 50 with being sandwiched between the side sill reinforcing member 62 and the side sill outer portion 56.

Figure 2B:
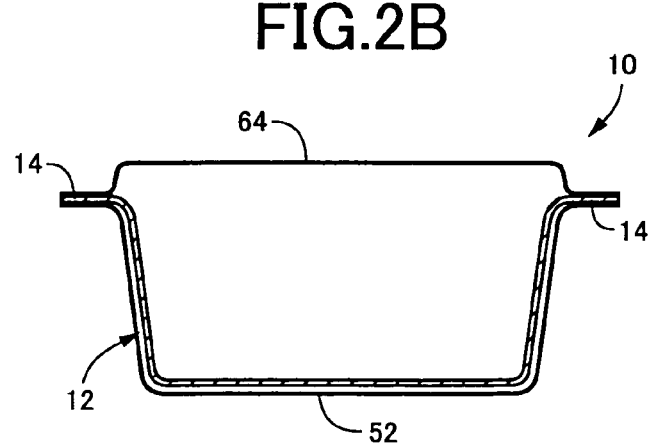

As is clear from FIG. 2B, the reinforcing member 12, having a U shape transverse cross section, is fitted in a substantially overlapping manner in the center pillar outer portion 52, which likewise has a U shape transverse cross section. At an open side of the U shape, i.e. at the vehicle inner side, a center pillar inner panel 64 is disposed to close the opening of the U shape and is integrally fixed by welding along end edges of the opening. The center pillar inner panel 64, together with the center pillar outer portion 52, forms the hollow vehicle center pillar 10 having a rectangular (quadrilateral) closed cross section, an inside of which the reinforcing member 12 is housed in an integrally fixed state. At respective end edges of the opening of the U shape of the reinforcing member 12 are provided with flanges 14, each being bent substantially at right angle outwardly. The flanges 14 are integrally welded with being sandwiched between the center pillar outer portion 52 and the center pillar inner panel 64.

The roof side rail reinforcing member 60 and the roof side rail outer portion 54 both having substantially U shape cross-sections, are fitted to each other in a substantially overlapping manner, and are integrally fixed by welding. This is true for the side sill reinforcing member 62 and the side sill outer portion 56. Also, although not illustrated, a roof side rail inner panel and a side sill inner panel are integrally fixed by welding to the vehicle inner sides of the roof side rail reinforcing member 60 and the side sill reinforcing member 62 respectively to close the openings of the U shapes. Thus, a roof side rail and a side sill having closed cross sections are constructed.

Returning now to FIG. 1, the reinforcing member 12 according to the present embodiment is constructed by a substantially T-shaped upper member 20 connected to the roof side rail reinforcing member 60, a lower member 22 connected to the side sill reinforcing member 62, and a central member 24 disposed between the upper member 20 and the lower member 22. These members are integrally bonded by welding to each other at an upper welding line 26 and a lower welding line 28.

The upper member 20 is disposed in a predetermined range of no more than 1.5 times a dimension from its upper end to lower ends of arc-shaped door frame corner portions 30 and 32, at respective sides of a T shape, continuing from the roof side rail to the center pillar 10. Thus, the door frame corner portions 30 and 32 are completely contained in the upper member 20. In the present embodiment, the upper member 20 extends to location positioned slightly below the lower ends of the door frame corner portions 30 and 32.

A height range of the lower member 22 is set as suited to provide a predetermined reinforcing strength in consideration of cross-sectional shape, size, etc., of the reinforcing member 12. In the present embodiment, the lower member 22 extends in a range approximately from $1/5$ to $1/3$ of a total height H of the reinforcing member 12, and, for example, it extends a height range of approximately $1/4$ from a lower end.

The upper member 20, the lower member 22 and the central member 24 are respectively constructed by separate steel plates different in tensile strength. The tensile strength of the steel plate constituting the upper member 20 is lower than the tensile strength of the steel plate of the central member 24, and is higher than the tensile strength of the steel plate of the lower member 22. Specifically, the upper member 20 is constructed by the high tensile steel plate with the tensile strength in a range of no less than 590 MPa and less than 780 MPa, the central member 24 is constructed by the high tensile steel plate with the tensile strength in a range of no less than 780 MPa and no more than 1180 MPa, and the lower member 22 is constructed by the high tensile steel plate with the tensile strength of less than 590 MPa. The central member 24 is, for example, constructed by the ultra-high tensile steel plate with the tensile strength of approximately 980 MPa.

The high tensile steel plates and the ultra-high tensile steel plate are integrally bonded by welding means such as arc welding, seam welding, plasma welding or laser welding, with lateral ends being butted against each other in advance within the same i.e. common plane. They are formed to a predetermined shape thereafter by cold pressing or hot pressing. The upper welding line 26 and the lower welding line 28 are portions that are bonded by welding before pressing. The respective plate thickness of the three types of steel plates that are bonded by welding is not necessarily the same, but they can be set in consideration of the required strength, press forming properties, etc. Also, bonding by welding with being butted against each other is not necessarily, but the bonding by the spot welding may instead be performed with overlapping ends of the steel plates.

The reinforcing member 12 for the vehicle center pillar 10 according to the present embodiment is constructed by the three members including the upper member 20, the lower member 22 and the central member 24. The tensile strength of the steel plate constructing the upper member 20 is lower than the tensile strength of the steel plate of the central member 24, and is higher than the tensile strength of the steel plate of the lower member 22. Thus, in comparison to the conventional reinforcing member in which the upper member 20 and the central member 24 are integrally constructed by an ultra-high tensile steel plate, fluctuation of internally generated residual stress is small. Consequently, with the reduced deforming amount due to camber recovery that accompany elastic recovery and twisting, shape accuracy of the reinforcing member 12 is improved, and forming by pressing becomes easy.

Also, the roof side T-shaped portion constructed by the upper member 20 is improved in the drawing property, and the door frame corner portions 30 and 32 are improved in the outer trimming property. In these points, not only the shape accuracy of the reinforcing member 12 is improved, but, due to the suppressed forming of cracks within a product cross section, yield and productivity are improved.

Because of the improved press forming property of the upper member 20 such as the forming accuracy, drawing properties and outer trimming property, the central member 24 can be constructed by an ultra-high tensile having a high-strength, etc. with excellent shape accuracy even upon the cold press forming. As a result, a weight saved reinforcing member 12 with the predetermined high strength can be manufactured easily and inexpensively. Also, the upper member 20, though being lower in tensile strength than the central member 24, is higher in tensile strength than the lower member 22. Therefore, with suppressing the lowering of strength and rigidity balance, and the weight increase of the reinforcing member 12 as a whole, the predetermined safety performance can be secured by suppressing the center pillar 10 from entering into a vehicle compartment as much as possible, upon lateral collision.

That is, the lower member 22 which is large in the section modulus, is not required to have very high tensile strength. Meanwhile, the central member 24 which is a portion influencing highest on safety performance for an occupant and is smaller in the section modulus than the lower member 22, is required to have a high tensile strength to secure the predetermined safety performance, and to realize the weight saving. Also, in the upper member 20 having a main role to be bonded with the roof rail, size of the bonding area with the roof rail influences on the bonding strength more than the tensile strength thereof. Thus, by using the high tensile steel plate for the upper member 20 with the tensile strength lower than that of the central member 24, the press forming property of the upper member 20 is improved, so that the shape accuracy is improved and an adequate bonding strength can be secured.

Also, the upper member 20 is disposed within the predetermined range of no more than 1.5 times the dimension from its upper end to the lower ends of the door frame corner portions 30 and 32, to completely contain the door frame corner portions 30 and 32 therein. Therefore, while improving the shape accuracy of the reinforcing member 12 by improving the press forming properties of the roof side T-shaped portion of the upper member 20, the predetermined reinforcing strength required for the reinforcing member 12 can be secured by the central member 24 of high tensile strength, which also realizes the weight saving. Specifically, because a portion corresponding from a chest to a head of an occupant is constructed by the central member 24 of high tensile strength, an excellent safety performance can be secured.

Also, the upper member 20 is constructed by the high tensile steel plate with the tensile strength in the range of no less than 590 MPa and less than 780 MPa, the central member 24 is constructed by the high tensile steel plate with the tensile strength of no less than 780 MPa and no more than 1180 MPa, and the lower member 22 is constructed by the high tensile steel plate with the tensile strength of less than 590 MPa. Therefore, the shape accuracy of the reinforcing member 12 can be increased by improvement of the press forming property, the predetermined reinforcing strength required for the reinforcing member 12 can thus be secured, and weight saving of the reinforcing member 12 is realized.

Because of the improved press forming property such as the forming accuracy, the drawing property and the outer trimming property, man-hours required for do-overs in a production preparation stage related to pressing can be reduced. Consequently, shortening of a production preparation lead time, and reduction of man-hours for corrections in a mass production stage can be anticipated.

When the reinforcing member 12 is formed by hot pressing, its shape accuracy is improved further. This is because material softened by heating improves the press forming property, and the form freezing property due to quenching in a press mold suppresses deformation by camber recovery and twisting after pressing.

By using the steel plate for the hot pressing as the central member 24 in the forming by hot pressing, even when the tensile strength after hot pressing is no less than 780 MPa, the predetermined reinforcing strength required for the reinforcing member 12 can be secured. Raising the tensile strength by hot pressing to no less than 1400 MPa depending on the steel kind can realize further weight saving with the steel plate thinned in plate thickness.

Also, the steel plate for hot pressing having quenching property can be used for the central member 24, with normal steel plates being used for both the upper member 20 and the lower member 22. However, the steel plates for hot pressing may be also used for the upper member 20 and the lower member 22 within a range satisfying the magnitude relationship of the tensile strengths with other members.

Although the embodiments of the present invention has been described in detail based on the drawings, they are no more than illustration. The present invention can be carried out in modes with various modifications and improvements applied based on the knowledge of those skilled in the art.

What is claimed is:

1. A reinforcing member for a vehicle center pillar, comprising:
    an upper reinforcing member portion;
    an elongate central reinforcing member portion welded to said upper reinforcing member portion; and
    a lower reinforcing member portion welded to said central reinforcing member portion;
    wherein said upper reinforcing member portion, lower reinforcing member portion and central reinforcing member portion define an integral reinforcing structure extending substantially an entire length of the vehicle center pillar;
    wherein the respective upper, central, and lower reinforcing member portions are constructed by separate steel plates mutually different in tensile strength, with the central reinforcing member portion comprising a high tensile steel plate with a tensile strength of no less than 780 MPa, and the upper reinforcing member portion comprising a high tensile steel plate with a tensile strength of less than 780 MPa, which is higher than the tensile strength of the steel plate of the lower reinforcing member portion;
    wherein the integral reinforcing structure comprises a predetermined pressed shape; and
    wherein the upper reinforcing member portion is connected to a roof side rail of the vehicle center pillar and the lower reinforcing member portion is connected to a side sill of the vehicle center pillar.

2. The reinforcing member for the vehicle center pillar according to claim 1,
    wherein the upper reinforcing member is disposed within a predetermined range of no more than 1.5 times a dimension from an upper end thereof to a lower end of a door frame corner portion continuing from the roof side rail to the center pillar to completely contain the door corner portion therein.

3. The reinforcing member for the vehicle center pillar according to claim 2,
    wherein the upper reinforcing member portion has the tensile strength of no less than 590 MPa; and
    the lower reinforcing member portion comprises a high tensile steel plate with a tensile strength of less than 590 MPa.

4. The reinforcing member for the vehicle center pillar according to claim 2,
    wherein the reinforcing member is formed by hot pressing, and the central reinforcing member portion comprises a steel plate for hot pressing having a quenching property to have the tensile strength of no less than 780 MPa after hot pressing.

5. The reinforcing member for the vehicle center pillar according to claim 1,
    wherein the upper reinforcing member portion has the tensile strength of no less than 590 MPa; and
    the lower reinforcing member portion comprises a high tensile steel plate with a tensile strength of less than 590 MPa.

6. The reinforcing member for the vehicle center pillar according to claim 5,
    wherein the reinforcing member is formed by hot pressing, and the central reinforcing member portion comprises a steel plate for hot pressing having a quenching property to have the tensile strength of no less than 780 MPa after hot pressing.

7. The reinforcing member for the vehicle center pillar according to claim 1, wherein the reinforcing member is formed by hot pressing, and the central reinforcing member portion comprises a steel plate for hot pressing having a quenching property to have the tensile strength of no less than 780 MPa after hot pressing.

8. A reinforcing member for a vehicle center pillar, comprising:

an upper reinforcing member portion;

an elongate central reinforcing member portion welded to said upper reinforcing member portion; and a lower reinforcing member portion welded to said central reinforcing member portion;

wherein said upper reinforcing member portion, lower reinforcing member portion and central reinforcing member portion define an integral reinforcing structure extending substantially an entire length of the vehicle center pillar;

wherein the respective upper, central, and lower reinforcing member portions are constructed by separate steel plates mutually different in tensile strength with the central reinforcing member portion comprising a high tensile steel plate with a tensile strength of no less than 780 MPa, and the upper reinforcing member portion comprising a high tensile steel plate with a tensile strength of less than 780 MPa, which is higher than the tensile strength of the steel plate of the lower reinforcing member portion; and wherein the upper reinforcing member portion is connected to a roof side rail of the vehicle center pillar and the lower reinforcing member portion is connected to a side sill of the vehicle center pillar.

\* \* \* \* \*